United States Patent [19]

Yan

[11] 4,188,279
[45] Feb. 12, 1980

[54] SHAPED CARBON ARTICLES

[75] Inventor: Tsoung-Yuan Yan, Philadelphia, Pa.

[73] Assignee: Mobil Oil Corporation, New York, N.Y.

[21] Appl. No.: 867,557

[22] Filed: Jan. 6, 1978

Related U.S. Application Data

[63] Continuation-in-part of Ser. No. 735,302, Oct. 26, 1976, abandoned.

[51] Int. Cl.$^2$ .......................... C08L 95/00; C25B 11/12
[52] U.S. Cl. ..................... 204/294; 106/278; 106/279; 106/281 R; 208/22; 208/23; 208/40; 208/44; 252/502; 252/506; 252/508; 252/510; 264/29.1; 264/29.5; 264/29.7; 264/105
[58] Field of Search .................. 106/278, 279, 281 R; 208/22, 23, 40, 44; 264/29.1, 29.5, 29.7; 204/294

[56] References Cited

U.S. PATENT DOCUMENTS

| | | | |
|---|---|---|---|
| 2,340,847 | 2/1944 | Parkes | 106/280 |
| 2,949,430 | 8/1960 | Jörgensen | 264/29.1 X |
| 2,989,408 | 6/1961 | Lowe et al. | 106/284 |
| 3,035,932 | 5/1962 | McNamara et al. | 204/294 X |
| 3,147,205 | 9/1964 | Ohsol et al. | 208/22 X |
| 3,284,334 | 11/1966 | Metrailer et al. | 204/294 |
| 3,303,031 | 2/1967 | Shields | 106/284 |
| 3,303,122 | 2/1967 | Doelman | 208/45 |
| 3,304,186 | 2/1967 | Limes et al. | 106/284 |
| 3,382,084 | 5/1968 | Folkins et al. | 106/284 |
| 3,672,936 | 6/1972 | Ehrenreich | 264/29.2 X |
| 3,725,240 | 4/1973 | Baum | 208/22 |
| 3,751,278 | 8/1973 | Alexander | 208/22 X |
| 4,072,599 | 2/1978 | Bullough et al. | 204/294 |

*Primary Examiner*—Howard E. Schain
*Attorney, Agent, or Firm*—Charles A. Huggett; Raymond W. Barclay

[57] ABSTRACT

This invention provides novel electrode formulations which consist of solid carbonaceous filler, binder pitch, and an additive selected from phosphorus-containing and boron-containing compounds such as phosphorous pentoxide and boric acid.

13 Claims, No Drawings

SHAPED CARBON ARTICLES

CROSS-REFERENCE TO RELATED APPLICATION

This application is a continuation-in-part of U.S. patent application Ser. No. 735,302, filed Oct. 26, 1976, now abandoned, entitled "SHAPED CARBON ARTICLES" of Tsoung Yuan Yan.

BACKGROUND OF THE INVENTION

Shaped carbon articles are conventionally produced by mixing powdered carbon with a carbonaceous binder and forming the mixture into a green compact. The carbon may be present in the form of petroleum coke, coal coke, pitch coke, powdered graphite, carbon flour, and the like. The carbonaceous binder is tar or pitch derived from either petroleum or coal. These binders range from semi-liquid tars to solid pitches of high melting point.

After a green compact composition has been formed it is heated slowly to carbonize the binder. The greater the yield of carbon from the binder, the greater is the strength of the resulting bond between the carbon particles of the baked compact and the higher is the density.

High density and strength are particularly important when baked carbon articles are subsequently graphitized by high temperature treatment. To reduce porosity and increase strength, the shaped carbonaceous article is often impregnated with pitch and then recarbonized.

During the carbonizing process volatile material is driven off from the carbonaceous binder. At baking temperatures a scission of chemical bonds occurs, and some lighter constituents are formed and volatilized. Products of high molecular weight are generated by polymerization reactions. The greater the loss of volatile material during the carbonization process, the lower the strength and density of the final shaped carbon article. A variety of methods have been developed for reducing the quantity of volatile material lost during baking of a shaped carbon article, and for increasing the coking value of the binder component of a shaped carbon article.

U.S. Pat. No. 2,500,208 describes a reactive binder composition of high coking propensity consisting of a pitch containing a nitro aromatic additive.

U.S. Pat. No. 2,864,760 describes a method of improving the binding coke capacity of a coal tar binder pitch by pre-treating the binder pitch with a heavy metal chloride at a temperature of 150° C.–200° C.

U.S. Pat. No. 2,980,633 recommends the incorporation of an organo-metallic compound into green carbonaceous formulations for production of improved electrode type carbon articles.

U.S. Pat. No. 3,171,816 discloses a process for fabrication of carbon bodies with a mixture of granular coke, binder pitch, and an organic additive for reducing the binder softening point selected from unsaturated derivatives such as olefins, acetylenes, ketones, nitriles, and the like.

U.S. Pat. No. 3,280,042 proposes the inclusion of iron or aluminum chloride into a green mix to produce an improved graphite electrode.

Zinc chloride is known as a polymerization agent for increasing the carbon yield of an electrode binder. U.S. Pat. No. 3,505,090 suggests that some of the disadvantages of zinc chloride as an additive in green compact carbon formulations can be overcome by employing zinc chloride in the form of a complex with an organic amine compound.

There remains a need for novel green compact carbon formulations for production of electrodes and other shaped carbon articles which have improved mechanical and electrical properties.

Accordingly, it is an object of this invention to provide a green mix formulation which is adapted to produce baked carbon articles of high density and high compressive strength.

It is another object of this invention to provide a pre-bake electrode composition which includes a novel additive for increasing the binding coke capacity of the binder pitch component.

It is a further object of this invention to provide a carbon electrode which has a lower electrode consumption rate in aluminum electrolysis reactors than conventional carbon electrodes.

Other objects and advantages of the present invention shall become apparent from the accompanying description and exemplary data.

DESCRIPTION OF THE INVENTION

One or more objects of the present invention are accomplished by the provision of a composition for the production of shaped carbon articles which comprises a homogeneous blend of solid carbonaceous particles, binder pitch, and an additive selected from inorganic and organic phosphorus-containing and boron-containing compounds.

The solid carbonaceous particles which form the main mass of the shaped carbon articles can be any of the conventional carbon or coke solids such as calcined petroleum coke, anthracite, electrode scrap, lampblack, graphite, and the like. The particle size of the powdered carbon matrix is normally in the range between about 20 and 300 mesh. In a typical formulation, the particulated carbon filler would consist of about 75 weight percent of carbon particles which pass through a 35 mesh sieve, and about 25 weight percent of carbon particles which pass through a 200 mesh sieve.

The binder pitch component of the invention carbonaceous compositions generally conforms to the conventional binder pitches employed in carbon electrode production. The specification of the binder pitch is empirical in nature. A low hydrogen to carbon atomic ratio is desirable for minimizing the development of porosity during the baking cycle of the shaped carbon article manufacture. A high coking value in an important property of the binder pitch. The coking value is a measure of the amount of coke residue produced by a pitch when decomposed by heating at 650° C. for four hours. A pitch softening point in the range between about 80° C. and 145° C. is preferred.

The binder pitch component of the invention composition is of coal or petroleum origin, either by distillation or extraction processes. The binder pitch can also be a residual byproduct from the destructive distillation of wood or other vegetable or organic matter.

Illustrative of suitable types of binder pitches are those described in U.S. Pat. Nos. 2,500,208; 2,772,219; 3,238,116; 3,382,084; 3,510,328; 3,707,388; 3,725,240; 3,856,657; and the references cited therein.

A novel and preferred type of electrode binder pitch composition suitable for the practice of the present invention is disclosed in copending patent application Ser. No. 703,720. The said binder pitch composition consists essentially of a blend of a highly aromatic hydrocarbon solvent having a specific combination of physical properties and chemical constituency and selected benzene-soluble and benzene-insoluble fractions of solvent-refined coal and solvent-refined wood and is described in detail below.

HIGHLY AROMATIC HYDROCARBON SOLVENT

By the term "thermally stable" refinery petroleum fractions is meant a highly aromatic residuum such as fluidized catalytic cracking (FCC) "main column" bottoms or thermofor catalytic cracking (TCC) "syntower" bottoms which contain a substantial proportion of polycyclic aromatic hydrocarbon constituents such as naphthalene, dimethylnaphthalene, anthracene, phenanthrene, fluorene, chrysene, pyrene, perylene, diphenyl, benzothiophene, and the like. Such refractory petroleum media are resistant to conversion to lower molecular products by conventional non-hydrogenative procedures. Typically, these petroleum refinery residua and recycle fractions are hydrocarbonaceous mixtures having an average carbon to hydrogen ratio above about 1:1, and a boiling point above about 450° F.

The petroleum solvents suitable for the practice of the present invention process are thermally stable, highly polycyclic aromatic mixtures which result from one or more petroleum refining operations. Representative heavy petroleum solvents include FCC main column bottoms; TCC syntower bottoms; asphaltic material; alkane-deasphalted tar; coker gas oil; heavy cycle oil; FCC main column clarified slurry oil; mixtures thereof, and the like.

"FCC main column bottoms" and "TCC syntower bottoms" are obtained as petroleum refinery residual streams from gas oil catalytic cracking operations.

In a FCC operation, preheated gas oil is charged to a reactor inlet line, where it picks up finely divided (e.g., 100 mesh) regenerated catalyst from the regenerator-catalyst standpipe and carries it into the reactor. Sensible heat of the gas oil charge plus sensible heat of hot catalyst from regeneration at temperatures upwards of 1200° F. supply sufficient heat to sustain the endothermic cracking reaction at a desired temperature. The upward flow of hydrocarbons in the FCC reactor is adjusted to maintain a fluidized bed of the finely divided catalyst, thereby promoting contact between catalyst and charge. In a typical operation for preparing a highly aromatic petroleum solvent for this invention, California heavy gas oil (650° F.-1000° F.) is converted over a zeolite catalyst (e.g., as described in U.S. Pat. No. 3,140,249) in an FCC operation at 950°-975° F., a weight hourly space velocity of 11 and a catalyst to oil ratio of 8. Reaction products are then passed into a distillation column, in the bottoms section of which they are quenched to about 600° F. to condense the heaviest hydrocarbons. Quenching is accomplished by circulating heavy condensate through a cooler and then back through the bottoms section of the column. The circulating condensate scrubs catalyst fines out of the up-flowing reaction products. The catalyst slurry so produced is sent to a settler to concentrate the catalyst, and the concentrated catalyst is separated and returned to the reactor. The oil separated from the concentrated bottoms is referred to as "FCC main column bottoms" or "FCC bottoms" or "clarified slurry oil".

In a TCC operation, catalyst pellets of one-sixteenth inch diameter move downwardly through a reactor as a compact bed. In most modern TCC units, flow of gas oil charge is concurrent with catalyst flow in the reactor. As in FCC, heat of endothermic reaction is supplied by sensible heat of gas oil charge and catalyst. After charging wide cut gas oil (400°-1000° F.) from mixed Canadian crudes and employing a catalyst (e.g., as described in U.S. Pat. No. 3,140,249) at 875°-925° F. and a liquid hourly space velocity of 2 and a catalyst-to-oil ratio of 5, the reactor effluent is fractionated to provide a TCC bottoms fractions (i.e., "syntower bottoms") suitable for processing according to this invention.

The nominal properties of various highly aromatic refining petroleum streams are as follows:

| Syntower Bottoms | |
| --- | --- |
| Sulfur | 1.13% |
| Nitrogen | 450 ppm |
| Pour Point | 50° F. |
| 5% Boiling Point | 640° F. |
| 95% Point | 905° F. |
| Conradson Carbon | 9.96 |

| FCC Clarified Slurry Oil | |
| --- | --- |
| Sulfur | 1.04% |
| Nitrogen | 440 ppm |
| Pour Point | 50° F. |
| 5% Boiling Point | 630° F. |
| 95% Point | 924° F. |
| Conradson Carbon | 10.15 |

| Heavy Cycle Oil | |
| --- | --- |
| Sulfur | 1.12% |
| Nitrogen | 420 ppm |
| Initial Boiling Point | 373° F. |
| 95% Point | 752° F. |
| Conradson Carbon | 10.15 |

An FCC bottoms refinery stream is a highly preferred solvent component for the preparation of the present invention asphalt composition. A typical FCC main column bottoms stream (or FCC clarified slurry oil) contains a mixture of chemical constituents as represented in the following mass spectrometric analysis:

| Compounds | Aromatics | Naphthenic/ Aromatics |
| --- | --- | --- |
| Alkyl Benzenes | 0.4 | |
| Naphthene Benzenes | | 1.0 |
| Dinaphthene Benzenes | | 3.7 |
| Naphthalenes | 0.1 | |
| Acenaphthenes, (biphenyls) | | 7.4 |
| Fluorenes | | 10.1 |
| Phenanthrenes | 13.1 | |
| Naphthene phenanthrenes | | 11.0 |
| Pyrenes, fluoranthenes | 20.5 | |
| Chrysenes | 10.4 | |
| Benzofluoranthenes | 6.9 | |
| Perylenes | 5.2 | |
| Benzothiophenes | 2.4 | |
| Dibenzothiophenes | 5.4 | |
| Naphthobenzothiopenes | | 2.4 |
| Total | 64.4 | 35.6 |

A typical FCC bottoms stream has the following nominal analysis and properties:

| Elemental Analysis, Wt. %: | |
|---|---|
| C | 89.93 |
| H | 7.35 |
| O | 0.99 |
| N | 0.44 |
| S | 1.09 |
| Total | 99.80 |

| Pour Point, °F.: | 50 |
|---|---|
| CCR, %: | 99.96 |

| Distillation: | |
|---|---|
| IBP, °F.: | 490 |
| 5%, °F.: | 640 |
| 95%, °F.: | 905 |

FCC main column bottoms are obtained (as noted above) by the catalytic cracking of gas oil in the presence of a solid porous catalyst. A more complete description of the production of this petroleum fraction is disclosed in U.S. Pat. No. 3,725,240.

A FCC main column bottoms is an excellent liquefaction solvent medium for (coal/wood) solubilization because it has a unique combination of physical properties and chemical constituency. A critical aspect of solvating ability is the particular proportions of aromatic and naphthenic and paraffinic moieties characteristic of a prospective liquefaction solvent. A high content of aromatic and naphthenic structures in a solvent is a criterion for high solvating ability for carbohydrate liquefaction.

The ability of a solvent to solvate carbonaceous materials can be expressed in terms of specific types of hydrogen content as determined by proton nuclear magnetic resonance spectral analysis. Nuclear magnetic resonance characterization of heavy hydrocarbon oils is well developed. The spectra (60 μc/sec) are divided into four bonds ($H_\alpha$, $H_\beta$, $H_\gamma$ and $H_{Ar}$) according to the following frequencies in Hertz (Hz) and chemical shift (δ):

| | $H_\alpha$ | $H_\beta$ | $H_\gamma$ | $H_{Ar}$ |
|---|---|---|---|---|
| Hz | 0–60 | 60–100 | 120–200 | 360–560 |
| δ | 0–1.0 | 1.0–1.8 | 2.0–3.3 | 6.0–9.2 |

The $H_{Ar}$ protons are attached to aromatic rings and are a measure of aromaticity of a solvent. $H_\alpha$ protons are attached to non-aromatic carbon atoms attached directly to an aromatic ring structure, e.g., alkyl groups and naphthenic ring structures. $H_\beta$ protons are attached to carbon atoms which are in a second position away from an aromatic ring, and $H_\gamma$ protons are attached to carbon atoms which are in a third position or more away from an aromatic ring structure.

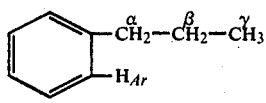

The $H_{Ar}$ protons are important because of their strong solvency power. A high content of $H_\alpha$ protons is particularly significant in a liquefaction solvent, because $H_\alpha$ protons are labile and are potential hydrogen donors in a solvation process. $H_\beta$ and $H_\gamma$ protons are paraffinic in nature and do not contribute to the solvating ability of a liquefaction solvent.

It is particularly preferred that the highly aromatic hydrocarbon solvent component of this invention has a hydrogen content distribution in which the $H_{Ar}$ proton content is between about 30 and 50 percent, the $H_\alpha$ proton content is at least about 30 percent and the $H_\alpha/H_\beta$ proton ratio is above about 1.4. Concomitantly it is desirable that the $H_\beta$ proton content is below 20 percent and the $H_\gamma$ proton content is below 13 percent. It is preferred that the highly aromatic hydrocarbon solvent component of this invention be a highly aromatic refinery petroleum residuum solvent having the above hydrogen content distribution and especially preferred that the highly aromatic refinery petroleum residuum solvent be selected from the group consisting of FCC main column bottoms and TCC syntower bottoms.

Petroleum solvents possessing the desired hydrogen content distribution are obtained as a bottoms fraction from the catalytic cracking or hydrocracking of gas oil stocks in the moving bed or fluidized bed reactor processes. In general depending upon such conditions as temperature, pressure catalyst-to-oil ratio, space velocity and catalyst nature, a high severity cracking process results in a petroleum residuum solvent having an increased content of $H_{Ar}$ and $H_\alpha$ protons and a decreased content of the less desirable $H_\beta$ and $H_\alpha$ protons.

The proton distribution in examples of various highly aromatic hydrocarbon by-product streams are shown below.

| Example | $H_\alpha$ | $H_\beta$ | $H_\gamma$ | $H_{Ar}$ | $H_\alpha/H_\beta$ |
|---|---|---|---|---|---|
| FCC/MCB | | | | | |
| #1 | 36.0 | 19.3 | 12.7 | 32.0 | 1.87 |
| #2 | 36.4 | 13.6 | 5.2 | 44.8 | 2.68 |
| #3 | 18.5 | 50.0 | 14.3 | 17.1 | 0.37 |
| #4 | 18.1 | 48.8 | 18.9 | 14.2 | 0.37 |
| TCC/Syntower Bottoms | | | | | |
| #1 | 29.8 | 20.9 | 7.9 | 41.4 | 1.42 |
| #2 | 16.3 | 48.1 | 20.0 | 15.6 | 0.35 |
| Clarified Slurry Oil | 19.4 | 48.5 | 16.5 | 15.5 | 0.40 |
| Agha Jari Resid (850 + °F.) | 12.0 | 60.0 | 24.0 | 5.0 | 0.20 |
| SRC Recycle Oil | 27.1 | 14.7 | 6.9 | 46.3 | 1.84 |
| Coal Tar | 5. | — | — | 91. | — |

From the foregoing it may be seen that hydrocarbons having the same general process derivation may or may not have the desired proton distribution identified in the foregoing discussion. For example, FCC/MCB #1 and #2 have the desired proton distribution while FCC/MCB #3 and #4 do not.

Furthermore, it is not necessary that the highly aromatic hydrocarbon solvent component of the novel asphalt composition of this invention be derived only from petroleum. In the above table, it may be noted that SRC recycle solvent closely resembles FCC/MCB #1 and #2, particularly in the $H_\alpha/H_\beta$ ratio. The following table, from an article entitled "Recycle Solvent Rechniques for the SRC Process," by R. P. Arderson, appearing in *Coal Processing Technology*, Volume 2, Am. Inst. of Chem. Engr., pages 130-32 (1975), shows that some SRC recycle solvents may be suitable for use as the highly aromatic hydrocarbon solvent component of the present invention. Shown in the table are the hydrogen distribution changes which occur during multiple passes of recycle solvent through the coal extraction step of an SRC process. The initial solvent employed was Gulf Carbon Black Feedstock FS 120.

| | $H_\alpha$ | $H_\beta$ | $H_\gamma$ | $H_{Ar}$ | $H_\alpha/H_\beta$ |
|---|---|---|---|---|---|
| Gulf FS 120 | 29.7 | 31.4 | 9.2 | 29.7 | 0.94 |
| Pass 1 | 30.8 | 30.2 | 8.2 | 30.8 | 1.02 |
| 2 | 31.3 | 28.4 | 7.1 | 33.2 | 1.10 |
| 3 | 29.9 | 26.7 | 7.4 | 36.0 | 1.12 |
| 4 | 30.3 | 24.7 | 6.9 | 38.1 | 1.23 |
| 5 | 30.1 | 23.9 | 6.2 | 39.8 | 1.26 |
| 6 | 28.8 | 22.3 | 7.0 | 41.9 | 1.29 |
| 7 | 28.7 | 21.2 | 6.3 | 43.8 | 1.35 |
| 8 | 29.4 | 20.0 | 5.8 | 44.7 | 1.46 |
| 9 | 29.7 | 19.3 | 4.9 | 46.1 | 1.54 |
| 10 | 30.0 | 18.8 | 4.7 | 46.5 | 1.60 |
| 11 | 29.8 | 18.8 | 4.9 | 46.5 | 1.58 |
| Raw Anthracene Oil | 18.9 | 3.4 | 0.6 | 77.1 | 5.6 |
| Partially Hydrogenated Anthracene Oil | 20.5 | 8.6 | 1.6 | 69.3 | 2.4 |
| Anthracene Oil Recycle | 23.3 | 15.2 | 4.7 | 56.7 | 1.53 |

Although not preferred, recycle solvents such as shown from passes 9–11 of the foregoing table may be employed as the highly aromatic hydrocarbon solvent component of this invention.

SOLVENT REFINED COAL

By the term "solvent-refined" coal is meant any of the purified carbonaceous materials produced by the steps of (1) liquefaction of coal in a highly aromatic or partially hydrogenated aromatic solvent (e.g., tetralin, anthracene, recycle coal oil, and the like); (2) separation of a solvent-rich liquefaction phase from ash and other undissolved solids; (3) distillation of the liquefaction phase to remove the solvent and volatile components of the solution; and (4) recovery of the high boiling distillation residuum as "solvent-refined" coal.

In a typical process, solvent-refined coal is produced by (1) heating a mixture of powdered coal and recycle coal solvent (e.g., a distillation fraction recovered in a coal liquefaction process) at a temperature of about 790° F. under hydrogen pressure of about 1000–2000 psi for a period of about one hour; (2) separating the liquefaction phase from solids by filtration; (3) distilling the liquefaction phase to remove the solvent and volatile components which have a boiling point below about 600° F. at standard pressure; and (4) recovering solvent-refined coal which is substantially free of ash and has a much lower oxygen and sulfur content than in the original coal starting material. The solvent-refined coal is about 50 percent soluble in benzene (insoluble in pentane) and about 50 percent soluble in pyridine (insoluble in benzene). Table A summarizes the physical and chemical characteristics of W. Kentucky and Illinois types of coal, and the solvent-refined coal products derived therefrom in accordance with the hereinabove described liquefaction process.

The type of solvent-refined coal described in Table A contains about 50 percent by weight of asphaltene components. Table B summarizes the results of a chromatographic separation of solvent-refined coal components. The asphaltenes appear to be a mixture of polar hydrocarbons, indoles and benzofuran derivatives, each of which is substituted with phenyl and/or naphthyl groups.

TABLE A

| | W. Kentucky 14 Coal | | | Illinois #6 Coal | | |
|---|---|---|---|---|---|---|
| | Dry | Dry Ash Free | SRC Product | Dry | Dry Ash Free | SRC Product |
| C | 72.98 | 79.0 | 87.6 | 70.22 | 79.4 | 85.3 |
| H | 5.12 | 5.9 | 4.8 | 4.75 | 5.4 | 5.6 |
| N | 1.33 | 1.4 | 2.0 | 1.42 | 1.6 | 1.8 |
| S | 3.06 | 3.3 | 0.8 | 3.22 | 3.6 | 0.9 |
| Ash | 8.48 | — | 0.7 | 11.57 | — | 1.5 |
| O | 9.03 | 9.8 | 3.4 | 8.82 | 9.9 | 4.3 |

Coal $C_{100}H_{89}N_{1.5}S_{1.5}O_9$
SRC $C_{100}H_{66}N_{1.9}S_{0.3}O_{2.9}$
7800 SCF $H_2$/ton coal
8.5 atoms H/100 C Coal $C_{100}H_{89}N_{1.5}S_{1.5}O_9$
SRC $C_{100}H_{78}N_{1.8}S_{0.4}O_{3.8}$
Yield SRC 55 percent

TABLE B

Fractions Obtained By Liquid Chromatography On Silica Gel Of W. Kentucky 14 Solvent Refined Coal

|—Oil-like Compounds—| |—Multifunctional Compounds[2]—|

|—Asphaltenes [1]—|

| Fraction | #1 | #2 | #3 | #4 | #5 | #6 | #7 | #8 | #9 |
|---|---|---|---|---|---|---|---|---|---|
| Eluent | hexane | hexane 15% benzene | $CHCl_3$ | $CHCl_3$ 4% $Et_2O$ | $Et_2O$ 3% EtOH | MeOH | $CHCl_3$ 3% EtOH | THF 3% EtOH | Pyridine 3% EtOH |
| %in SRC[3] | 0.4 | 15 | 30 | 10.2 | 10.1 | 4.1 | 6.4 | 10.2 | 8.5 |

[1]Asphaltenes defined as benzene-soluble, pentane-insoluble compounds.
[2]Multifunctional products defined as pyridine-soluble, benzene-insoluble compounds.
[3]This analysis totals 94.9%. 5.1% of the SRC was not eluted from the column.

Another method of solvent-refining coal is by liquefaction of coal in the presence of a catalyst and a solvent under high hydrogen pressure at a temperature between about 650° F. and 750° F. Suitable catalysts include those containing metals such as molybdenum, zinc, magnesium, tungsten, iron, nickel, chromium, vanadium, palladium, platinum, and the like. High temperature, sulfur-resistant catalysts such as molybdenum and tungsten sulfide are preferred.

The nominal properties of various types of coals amenable to solvent-refining methods are as follows:

| High Volatile A | |
|---|---|
| Sulfur | 1.33% |
| Nitrogen | 1.63 |
| Oxygen | 7.79 |

| -continued |  |
|---|---|
| High Volatile A | |
| Carbon | 80.88 |
| Hydrogen | 5.33 |
| Ash | 2.77 |

| Sub Bituminous | |
|---|---|
| Sulfur | 0.21% |
| Nitrogen | 0.88 |
| Oxygen | 15.60 |
| Carbon | 65.53 |
| Hydrogen | 5.70 |
| Ash | 3.99 |

| Lignite | |
|---|---|
| Sulfur | 0.53 % |
| Nitrogen | 0.74 |
| Oxygen | 32.04 |
| Carbon | 54.38 |
| Hydrogen | 5.42 |
| Ash | 5.78 |

Ball mills or other types of conventional apparatus may be employed for pulverizing coarse coal in the preparation of comminuted feed coal for solvent-refining. The crushing and grinding of the coal can be accomplished either in a dry state or in the presence of liquefaction solvent. The average particle diameter of the feed coal is preferably below about 0.05 inches.

SOLVENT-REFINED WOOD

By the term "wood" is meant fibrous plant material which consists substantially of cellulose and lignin.

By the term "solvent-refined" wood is meant any of the purified carbonaceous materials produced by the steps of (1) liquefaction of wood in a highly aromatic or partially hydrogenated aromatic solvent; (2) separation of a solvent-rich liquefaction phase from ash and other undissolved solids; (3) distillation of the liquefaction phase to remove the solvent and volatile components of the solution; and (4) recovery of the high boiling distillation residuum as "solvent-refined" wood.

Wood can be solubilized with high efficiency by dissolving wood in a highly aromatic solvent at temperatures of about 600° F.–750° F. in the absence of any added reducing gases such as hydrogen or synthesis gas.

Pitch-like compositions which are flowable at room temperatures can be prepared at solvent to wood weight ratios as low as 1:1. Only sufficient pressure to maintain the solvent in the liquid state is required for dissolution of the wood.

Exceptionally high conversions of wood, and absence of carbonaceous residues, would seem to indicate that the wood depolymerizes during pyrolysis. The presence of a highly solvating medium (e.g., FCC main column bottoms) for the low molecular reaction products sharply decreases the rate of crosslinking and stabilizes the reaction products as lower molecular weight oils.

Table C discloses the results of liquefaction of various hard woods in FCC main column bottoms, FCC heavy cycle oil, and 850+° F. Agha Jari residuum at solvent to wood ratios varying between 2:1 and 1:1 over a temperature range of 700° F.–750° F. With the exception of Agha Jari residuum, the conversion yields are high.

In the case of the Agha Jari residuum, the low conversion yields are indicative of thermodynamic and kinetic factors such as repolymerization and crosslinking of low molecular weight intermediates, coking and cracking of the Agha Jari residuum, and loss of solvent.

TABLE C

Conversion Of Wood To Oil In Aromatic Petroleum Fractions

| Run | Wood-Type | Temperature °F. | Time hr. | Oil | Oil/Wood wt/wt | Conversion[1] |
|---|---|---|---|---|---|---|
| 1 | Pin Oak, dust | 750 | 1 | Syntower Bottoms | 2 | (89) repeat (95) extractions |
| 2 | Pin Oak, dust | 750 | 1 | Heavy Cycle Oil | 1 | 72 |
| 3 | White Oak, dust | 725 | 1 | Heavy Cycle Oil, 850 + °F. | 1 | 90 |
| 4 | Sawdust | 750 | 1 | Heavy Cycle Oil | 1.5 | 97 |
| 5 | Sawdust | 750 | 1 | Agha Jari, 850 + °F. | 1.5 | 52 |
| 6 | Sawdust | 700 | 3 | Agha Jari, 850 + °F. | 1.5 | −10 |
| 7 | Pine/Fir, sawdust | 750 | 0.5 | FCC Main Column Bottoms | 1.5 | 100 |
| 8 | Pine/Fir, sawdust | 600 | 0.75 | FCC Main Column Bottoms | 1.5 | 100 |
| 9 | Pine/Fir, sawdust | 600 | 1 | FCC Main Column Bottoms | 1.5 | 99 |

[1] Pyridine soluble portion, moisture-ash-free (MAF) basis, includes conversion to gaseous products.

Table D discloses the results of liquefaction of comminuted soft wood in FCC main column bottoms under different processing conditions. The fourth column in Table D reports the results obtained by the Bureau of Mines for the liquefaction of wood in tetralin under high hydrogen pressure. Table D lists the yields of benzene-soluble and benzene-insoluble fractions obtained from the wood, and lists the percentage of wood converted into water, gas and carbon (i.e., unreacted wood).

As a processing procedure in each of Runs A–C, pine/fir sawdust (60 grams) containing 12.8 grams of moisture is charged to a 300 milliliter stirred autoclave which contains FCC bottoms (90 grams) as a solvent medium. The reactor is sealed and brought to reaction temperature in about 45 minutes, and maintained at the reaction temperature for the desired reaction period before cooling to room temperature.

The gases are vented at 77° F. through a weighed drying tube to a gas collection bomb. The gases are analyzed by vapor phase chromatography or mass spectrometry.

TABLE D

Yields and Compositions of Wood Products From Liquefaction with FCC Bottoms

| Run | A | B | C | Bureau of Mines[5] |
|---|---|---|---|---|
| Operation Conditions | | | | |
| Temp., °F. | 750 | 600 | 600 | 770 |
| Time, hr. | ½ | ¾ | 1 | 3 |
| Initial Press., psig. | 0 | 0 | 0 | 1800 |
| Conversion, wt. %[1] | 100 | 100 | 99 | 100 |
| Product Yield, wt. %[1] | | | | |
| Liquid Product | 53.9 | 58.6 | 64 | 50 |
| Benzene Soluble | 8.5 | 28.0 | 12.9 | — |
| Benzene Insoluble[2] | 45.4 | 30.6 | 51.1 | — |
| Gas | 18.9 | 19.8 | 15.2 | 18 |
| Water | 26.2 | 22.5 | 20.8 | 32 |
| Unreacted Wood + Carbon | nil | nil | 0.7 | — |
| Product Quality | | | | |
| Benzene Soluble[3] | | | | |
| % C | —[6] | 76.7 | —[6] | — |
| % H | —[6] | 4.8 | — | — |
| % O | —[6] | 18.5 | — | — |
| Benzene Insoluble | | | | |
| % C | 85.01 | 82.17 | 79.05 | — |
| % H | 4.71 | 5.17 | 5.06 | — |
| % O | 8.02 | 10.51 | 12.94 | — |
| Oxygen Distribution[4] | | | | |
| $CO_x$ | 26.4 | 27.3 | 25.5 | — |
| $H_2O$ | 54.5 | 50.5 | 45.3 | — |
| Liquid Product | 25.5 | 22.7 | 29.2 | — |
| Hydrogen Distribution[4] | | | | |
| Liquid Product | 33.0 | 45.6 | 56.8 | — |
| Gas | 3.3 | 3.7 | 1.2 | — |
| $H_2O$ | 63.7 | 54.5 | 42.0 | — |

[1] Wt. % MAF Wood
[2] Benzene Insoluble, pyridine soluble
[3] Solvent Free Basis
[4] Wt. % of initial hydrogen and oxygen in the wood
[5] Bureau of Mines Technical Paper # 646, Pt III, 1942
[6] Not analyzed

PREPARATION OF ASPHALT COMPOSITIONS COMPRISING A PREFERRED ELECTRODE BINDER PITCH

An asphalt composition of the present invention can readily be prepared by admixing together the three major components described hereinabove, and heating the admixture until a homogeneous pitch-like blend is obtained.

In one of its preferred embodiments, the present invention provides a process for producing a low sulfur, high strength asphaltic binder suitable for carbon electrodes which comprises forming an admixture of (1) between about 30–45 weight percent of a highly aromatic petroleum solvent component having the hydrogen content distribution described above and selected from FCC main column bottoms and TCC syntower bottoms, (2) between about 20–35 weight percent of a highly aromatic component selected from benzene-soluble fractions of solvent-refined coal and solvent-refined wood, and (3) between about 20–40 weight percent of a highly aromatic component selected from benzene-insoluble fractions of solvent-refined coal and solvent-refined wood, and heating said admixture at a temperature between about 200° C. and 600° C. for a period of time sufficient to provide a homogeneous pitch-like composition.

A "benzene-soluble" fraction of solvent-refined coal or solvent-refined wood is one which corresponds, for example, to the fraction which dissolves when 50 grams of solvent-refined coal and/or wood are stirred in 100 milliliters of benzene at room temperature until phase equilibrium between dissolved and undissolved material is achieved. A "benzene-insoluble" fraction of solvent-refined coal or wood is one which corresponds to the fraction which remains undissolved under the conditions described above.

A particularly preferred asphalt composition of the present invention is one which has a sulfur content below about 0.3 weight percent, and which consists substantially of organic derivatives having a boiling point in the range between about 450° F. and 1200° F., and most preferably in the range between about 600° F. and 1200° F.

Although it is not required, an asphalt composition of the present invention can be subjected to air-blowing conditions to modify the chemical and physical properties of the composition in a desired manner. As described in U.S. Pat. No. 3,725,240 the blowing treatment can be conducted in the presence of air at a rate of from about 6 to about 30 standard cubic feet per minute per barrel, and preferably from about 10 to about 20 standard cubic feet per minute per barrel. The blowing can be conducted at a temperature between about 700° F. and 850° F., and a pressure between about 0 and 15 psig. A blowing treatment period not exceeding one hour is preferred, so as not to cause formation of coke which is deleterious in asphaltic compositions intended for application as electrode binders.

An asphalt composition of the present invention is evaluated by conventional industry methods. Functional tests are employed to determine pitch handling qualities and potential electrode characteristics. The compositional content of an asphalt composition is determined by physical analytical procedures such as gradient elution chromatography and nuclear magnetic resonance. Satisfactory quality standards for electrode binders are characterized as follows:

Softening point, °F.: . . . 230,
Specific gravity (77/77°)[1]: . . . 1.235 (min.),
Viscosity, cs. at 350° F.[1]: . . . 650 (max.),
Quinoline insolubles, percent wt: . . . 4 (max.),
Coke/binder equilibrium ratio, gms. coke/cc binder: . . . 1.5 (min.),
Relative crystallinity, percent: . . . 75 (min.),
Heat Hardening Test, 5 hrs. 485° F.:
  Loss, Wt. percent: . . . 4 (max.),
  Softening point increase °F.: . . . 20 (max.),
  Coke and sludge: . . . Moderate,
Nuclear magnetic resonance:
  Analysis, percent H on aromatic rings: . . . 50 (min.),
  $CH_3$ gamma to arom. ring: . . . 2 (max.).
At 230° F. soft point.

The present invention facilitates the production of a satisfactory carbon electrode binder pitch of 230° F. soft point, in which the pitch possesses a specific gravity in excess of 1.2; from 2 to 2% methyl groups (NMR); a coke/binder equilibrium of 1.5 minimum; a satisfactory heat-hardening test in which the weight loss is 4% maximum; the soft point increase is 20° F. maximum and the quantity of coke laydown is only slight or moderate; 8% maximum weight distillation at 850° F.; and a specific gravity-viscosity relationship, in which the binder exhibits both a relatively high specific gravity and a relatively low specific viscosity. Insofar as the Bureau of Mines Correlation Index (BMCI) is concerned, feed stocks having a relatively high index e.g., about 120 or higher, are particularly desirable.

PREPARATION OF SHAPED CARBON ARTICLES

The quantity of binder pitch component employed in the formulation of the present invention shaped carbon articles can vary in the range between about 15 and 35 percent, based on total composition weight. A binder pitch content between about 15 and 20 percent is preferred in the formulation of pre-baked electrodes, and a binder pitch content between about 25 and 35 percent is preferred in the formulation of Soderberg electrode compositions.

The additive component of the invention compositions for the production of shaped carbon articles is selected from inorganic and organic phosphorus-containing and boron-containing compounds.

The phosphorus-containing compounds include classes of derivatives such as organic phosphites, phosphines, phosphonates, and the like, and inorganic phosphorus oxides, halides, sulfides, nitrides, oxysulfides, acids, and the like. Illustrative of phosphorus-containing compounds are trimethyl phosphite, triphenyl phosphine, benzenephosphonic acid, phosphorus pentoxide, phosphorus trichloride, phosphorus pentachloride, phosphoric acid, phosphinic acid, phosphorous acid, and the like.

The boron-containing compounds are preferably limited to readily available solids such as boron oxides and boric acid.

The quantity of additive compound included in the invention compound can vary in the range between about 0.1 and 10 percent, based on the total composition weight. The preferred weight of additive is between about 0.5 and 5 percent of phosphorus-containing compound, or between about 0.1 and 3 weight percent of boron-containing compound. The additive compounds should not contain metal elements, such as iron, having a lower oxidation potential than aluminum. Aluminum phosphate and borate are suitable additive compounds for the purposes of the present invention compositions.

The invention composition components can be blended in several ways. In one method, the carbon particles and binder pitch are mixed and the mixture is passed through a pulverizer to reduce the carbon particles and pitch to a fine flour. To the homogenized blend is added the phosphorus-containing or boron-containing compound. The final blending is accomplished at a temperature above the softening point of the binder pitch, e.g., at a temperature between about 120° C. and 200° C.

Alternatively, the binder pitch and additive compound can be mixed together, and then the mixture finally blended with the carbon matrix component, or all three of the components can be mixed and blended simultaneously.

The homogeneous blend of components is subsequently shaped by the application of pressure, preferably by extrusion in accordance with conventional techniques. The shaped green compact is baked in a furnace at a temperature between about 800° C. and 1400° C. The baked carbon articles so produced can be graphitized by heating at a temperature between about 2000° C. and 3000° C.

The carbon electrodes produced in accordance with the present invention have a higher density and strength, and a lower resistivity and coefficient of thermal expansion, than corresponding carbon electrodes which do not contain a phosphorus-containing or boron-containing additive component. The invention carbon electrodes have a minimum compressive strength of 10,000 psi, a density of at least 1.5, and a maximum resistivity of 0.003 ohm/inch$^3$.

An important characteristic of present invention carbon electrodes is the apparent reduced rate of consumption in aluminum reduction applications. In the electrolysis process for aluminum production, the carbon electrode is consumed to form $CO_2$. However, additional electrode is consumed through secondary reactions:

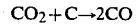

$CO_2 + C \rightarrow 2CO$

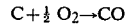

$C + \tfrac{1}{2} O_2 \rightarrow CO$

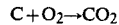

$C + O_2 \rightarrow CO_2$

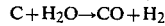

$C + H_2O \rightarrow CO + H_2$

These secondary reactions are inhibited by the presence of phosphorus or boron in the invention carbon electrodes. Hence, the present invention carbon electrodes are consumed at a 10–15 percent lower rate than conventional carbon electrodes. This represents a prospective saving of about 500,000 tons per year of carbon electrodes in the United States alone.

The following exemplary data are further illustrative of the present invention. The composition components and other specific ingredients are presented as being typical, and various modifications can be derived in view of the foregoing disclosure within the scope of the invention.

EXAMPLE

An electrode formulation is prepared by blending together at 150° C. a mixture of (1) 73 parts by weight of calcined petroleum coke having a particle size range of 35–200 mesh, (2) 25 parts by weight of medium coal tar binder pitch (softening point, 92° C., ring and ball), and (3) 2 parts by weight of boric acid. After 30 minutes of heating, 2 parts by weight of an oil lubricant are added and the blending is continued for an additional 10 minutes.

The extrusion of green electrodes is conducted at about 150° C. and 3500 psi pressure. The extruded electrode sections are baked at a temperature of 1000° C. The apparent density of the baked electrodes is about 1.70, the resistivity is 0.0015 ohm/inch$^3$ and the axial crushing strength is about 11,900 pounds/inch$^2$.

For control purposes, identical electrodes are produced, with the exception that the boric acid additive is excluded. The density and crushing strength of the control electrodes are about 10 percent lower than the corresponding present invention electrodes.

Under the same conditions of aluminum reduction, the present invention electrodes exhibit an average of about 15 percent lower consumption of electrode mass than do the control electrodes.

What is claimed is:

1. A pre-bake electrode composition consisting essentially of a homogeneous blend of pulverized carbon filler, between about 15 and 35 percent by weight of electrode binder pitch, and between about 0.1 and 10 percent by weight of an additive selected from phosphorus and boron oxides and acids; wherein said electrode binder pitch consists essentially of a homogeneous blend of (1) between about 30–45 weight percent of a highly aromatic hydrocarbon solvent component having a boiling point between about 450° F. to 1200° F. and having a hydrogen content distribution in which the $H_{Ar}$ proton content is between about 30 and 50 percent, the $H_\alpha$ proton content is at least 30 percent and the $H_\alpha/H_\beta$ proton ratio is above about 1.4; (2) between about 20–35 weight percent of a highly aromatic component selected from benzene-soluble fractions of solvent-refined coal and solvent-refined wood; and (3) between about 20–40 weight percent of a highly aromatic component selected from benzene-insoluble fractions of solvent-refined coal and solvent-refined wood, wherein the binder composition has a 230° F. soft point and a specific gravity in excess of 1.2.

2. The composition of claim 1 wherein said highly aromatic hydrocarbon solvent component is petroleum residuum solvent.

3. The composition of claim 2 wherein the petroleum residuum solvent is selected from the group consisting of FCC main column bottoms and TCC syntower bottoms.

4. A carbon electrode consisting essentially of a baked homogeneous blend of a particulate coke matrix, between about 15 and 35 percent by weight of electrode binder pitch, and between about 0.1 and 10 percent by weight of an additive selected from phosphorus and boron oxides and acids; wherein said electrode binder pitch consists essentially of a homogeneous blend of (1) between about 30–45 weight percent of a highly aromatic hydrocarbon solvent component having a boiling point between about 450° F. to 1200° F. and having a hydrogen content distribution in which the $H_{Ar}$ proton content is between about 30 and 50 percent, the $H_\alpha$ proton content is at least 30 percent and the $H_\alpha/H_\beta$ proton ratio is above about 1.4; (2) between about 20–35 weight percent of a highly aromatic component selected from benzene-soluble fractions of solvent-refined coal and solvent-refined wood; and (3) between about 20–40 weight percent of a highly aromatic component selected from benzene-insoluble fractions of solvent-refined coal and solvent-refined wood, wherein the binder composition has a 230° F. soft point and a specific gravity in excess of 1.2.

5. The carbon electrode of claim 4 wherein said highly aromatic hydrocarbon solvent component is petroleum residuum solvent.

6. The carbon electrode of claim 4 wherein the petroleum residuum solvent is selected from the group consisting of FCC main column bottoms and TCC syntower bottoms.

7. A carbon electrode consisting essentially of a graphitized homogeneous blend of a particulate coke matrix, between about 15 and 35 percent by weight of electrode binder pitch, and between about 0.1 and 10 percent by weight of an additive selected from phosphorus and boron oxides and acids; wherein said electrode binder pitch consists essentially of a homogeneous blend of (1) between about 30–45 weight percent of a highly aromatic hydrocarbon solvent component having a boiling point between about 450° F. to 1200° F. and having a hydrogen content distribution in which the $H_{Ar}$ proton content is between about 30 and 50 percent, the $H_\alpha$ proton content is at least 30 percent and the $H_\alpha/H_\beta$ proton ratio is above about 1.4; (2) between about 20–35 weight percent of a highly aromatic component selected from benzene-soluble fractions of solvent-refined coal and solvent-refined wood; and (3) between about 20–40 weight percent of a highly aromatic component selected from benzene-insoluble fractions of solvent-refined coal and solvent-refined wood, wherein the binder composition has a 230° F. soft point and a specific gravity in excess of 1.2.

8. The carbon electrode of claim 7 wherein said highly aromatic hydrocarbon solvent component is petroleum residuum solvent.

9. The carbon electrode of claim 7 wherein the petroleum residuum solvent is selected from the group consisting of FCC main column bottoms and TCC syntower bottoms.

10. In a process for producing shaped carbon articles having high density and strength comprising:
 (a) mixing a carbonaceous filler, between about 15 and 35 percent by weight of electrode binder pitch, and between about 0.1 and 10 percent by weight of an additive selected from phosphorus and boron oxides and acids;
 (b) forming the mixture into a shaped green compact; and
 (c) heating the shaped green compact at a temperature between about 800° C. and 1400° C. to produce a baked carbon article;
the improvement which comprises employing an electrode binder pitch consisting essentially of a homogeneous blend of (1) between about 30–45 weight percent of a highly aromatic hydrocarbon solvent component having a boiling point between about 450° F. to 1200° F. and having a hydrogen content distribution in which the $H_{Ar}$ proton content is between about 30 and 50 percent, the $H_\alpha$ proton content is at least 30 percent and the $H_\alpha/H_\beta$ proton ratio is above about 1.4; (2) between about 20–35 weight percent of a highly aromatic component selected from benzene-soluble fractions of solvent-refined coal and solvent-refined wood; and (3) between about 20–40 weight percent of a highly aromatic component selected from benzene-insoluble fractions of solvent-refined coal and solvent-refined wood, wherein the binder composition has a 230° F. soft point and a specific gravity in excess of 1.2.

11. The process of claim 10 wherein said highly aromatic hydrocarbon solvent component is petroleum residuum solvent.

12. The process of claim 10 wherein the petroleum residuum solvent is selected from the group consisting of FCC main column bottoms and TCC syntower bottoms.

13. The process of claim 10 wherein the baked carbon article is graphitized at a temperature between about 2000° C. and 3000° C.

* * * * *

UNITED STATES PATENT AND TRADEMARK OFFICE
CERTIFICATE OF CORRECTION

PATENT NO. : 4,188,279

DATED : February 12, 1980

INVENTOR(S) : Tsoung Yuan Yan

It is certified that error appears in the above-identified patent and that said Letters Patent are hereby corrected as shown below:

Col. 11, Table D: Under "Product Quality Benzene Soluble" "%H in Column A "-10" should be deleted, and "%10" in Column A "-10" should be deleted Under "Hydrogen Distribution $H_2O$" in Column B "54.5" should be -- 54.4 --.

Signed and Sealed this

Second Day of September 1980

[SEAL]

Attest:

SIDNEY A. DIAMOND

Attesting Officer

Commissioner of Patents and Trademarks